United States Patent [19]

Berrun-Castanon et al.

[11] Patent Number: 5,181,954
[45] Date of Patent: Jan. 26, 1993

[54] METHOD FOR COATING IRON-BEARING PARTICLES TO BE PROCESSED IN A DIRECT REDUCTION PROCESS

[75] Inventors: Jorge D. Berrun-Castanon, San Nicolas de los Garza; Maria T. Guerra-Reyes, San Pedro Garza García; Leopoldo I. Ruiz-Leal, Monterrey, all of Mexico

[73] Assignee: Hylsa S.A. de C.V., Monterrey, Mexico

[21] Appl. No.: 640,969

[22] Filed: Jan. 14, 1991

[51] Int. Cl.$^5$ ............................................. C21B 13/00
[52] U.S. Cl. ..................................... 75/433; 427/216; 427/421; 427/427; 118/300; 118/303; 239/143; 239/379; 428/404
[58] Field of Search ............... 427/180, 215, 216, 424, 427/427, 421; 118/303, 324, 300; 106/770; 428/404; 75/322, 773, 433; 239/143, 379, 569

[56] References Cited

U.S. PATENT DOCUMENTS

| | | | |
|---|---|---|---|
| 2,862,808 | 12/1958 | De Jahn | 75/490 |
| 3,765,872 | 10/1973 | Celada | 75/379 |
| 4,046,557 | 9/1977 | Beggs | 75/490 |
| 4,118,017 | 10/1978 | Hendrickson | 266/187 |
| 4,150,972 | 4/1979 | Price-Falcon | 75/495 |
| 4,254,167 | 3/1981 | Sulzbacher et al. | 427/216 |
| 4,374,585 | 2/1983 | Papst | 266/81 |
| 4,388,116 | 6/1983 | Carrillo-Cantu | 106/643 |
| 4,449,671 | 5/1984 | Martinez Vera | 241/36 |
| 4,528,030 | 7/1985 | Martinez Vera | 75/496 |

FOREIGN PATENT DOCUMENTS

| | | |
|---|---|---|
| 0207779 | 3/1990 | European Pat. Off. . |
| 2061346 | 6/1972 | Fed. Rep. of Germany . |
| 55-7312 | 2/1980 | Japan ..................... 427/427 |
| 62-7806 | 1/1987 | Japan ..................... 427/216 |
| 63-262426 | 10/1988 | Japan ..................... 427/216 |

OTHER PUBLICATIONS

K. Narita et al., "Study on Clustering and its Prevention in the Shaft Furnace for Direct Reduction Process," Trans. ISIJ, vol. 20, pp. 228–235, 1980.

*Primary Examiner—*
*Assistant Examiner—*Terry J. Owens
*Attorney, Agent, or Firm—*A. Thomas S. Safford

[57] ABSTRACT

At least a percentage of iron ore pellets and the like for use in a direct reduction process for the production of sponge iron are coated with a thin porous coating of Portland cement to counteract tendency to aggregate. This is accomplished by method and apparatus that mixes water and cement powder at the point of delivery in a manner such that no pumps are subjected to a wet cement slurry. The slurry is mixed and maintained in suspension by air agitation in a bin and then flowed through a bin discharge pipe and sprayed therefrom onto a passing layer of pellets in a controlled manner by regulated air injection into the discharage pipe.

7 Claims, 2 Drawing Sheets

METHOD FOR COATING IRON-BEARING PARTICLES TO BE PROCESSED IN A DIRECT REDUCTION PROCESS

FIELD OF THE INVENTION

The present invention is related to a method and apparatus for coating iron-bearing particles with cement to avoid clustering of such particles when subjected to a direct reduction process. This invention has particular application in the iron and steel industry wherein metallic iron is obtained by reducing particulate iron ores by means of a reducing gas at high temperature.

BACKGROUND OF THE INVENTION

Starting about 30 years ago, the steel industry has been gradually adopting the so-called Direct Reduction processes (DR), first only in plants of relatively small capacity, less than 500,000 tons per year, and lately at increasingly larger capacity, from 3 to 4 million tons per year. See for example U.S. Pat. Nos. 3,765,872; 4,046,577 and 4,150,972. DR plants provide an alternate route to obtain metallic iron from iron ores, mainly iron oxides, wherein iron-bearing particles are treated in the solid state with a reducing gas at high temperature in a reduction reactor, thus obtaining an intermediate product known as sponge iron or Direct Reduced Iron (DRI).

DRI is a solid material resulting from the reaction of said iron ores with a reducing gas which is mainly composed of hydrogen and carbon monoxide. The reducing gas is normally produced by reformation of natural gas with steam in a catalytic reformer. There have been developments however which permit running a DR process without said catalytic reformer by feeding natural gas directly to the reduction reactor. See for example U.S. Pat. No. 4,528,030.

Feedstock materials for DR processes comprise high grade iron ores, e.g. having a total iron content higher than 60%, whether in lump form with particle sizes between 0.37 and 1.5 inches, or pellets, of a particle size between 0.37 and 0.75 inches, made by grinding iron ores and magnetically concentrating the iron content thereof and finally subjecting said "green" pellets to an induration process at temperatures above 1200° C. It has been also a common practice to feed mixtures of lumps and pellets to DR reactors thus overcoming certain operational problems of DR plants.

The essence of the DR processes is to be able to bring into uniform contact with a mass of solid iron-bearing particles (lumps or pellets) a stream of a reducing gas, at a temperature above 850° C., to effect the reaction of iron oxide content to produce metallic iron in the solid particles and water and carbon dioxide as gaseous by-products.

These reduction reactions take place in a reactor, usually referred to as a shaft furnace, which may be of the moving bed type, fixed bed type, fluidized bed type, or rotary kiln type. The preferred reactor, employed nowadays in the steel industry is the moving bed type, followed by the fixed bed. Fluidized bed reactors have not yet been developed to a satisfactory degree of reliability and rotary kilns present scale-up problems for large capacities.

One of the principal problems affecting the productivity of DR plants of the moving bed and fixed bed type is the so called clustering of iron-bearing particles in the reduction reactor. The hot particles have a tendency to stick together in agglomerations (which adversely affect evenness of processing and subsequent handling). In a moving bed reactor, the iron-bearing particles are introduced thereto at its upper part, the bed of particles flows downwardly by action of gravity and are discharged at the lower part of said reactor through a solids flow regulating device which may be a vibratory feeder, a rotary or "star" valve, a "screw" feeder, or the like.

Ever since the initial uses of Direct Reduction processes in the 1950's and before, clustering problems have been known to occur with many iron ores and have been identified with the iron ore source. Certain ores have been found to have a higher sticking tendency than others, and the strength of the clusters formed increase with the temperature at which said ores are processed. Methods have been devised for predicting whether a given ore will present operational problems during reduction at a predetermined temperature. Accordingly, process operators even now maintain the process temperature in the reactor below a certain upper temperature limit characteristic of each iron ore. This measure however affects the productivity of the reactor (it being well known that the kinetics of the chemical reactions are exponentially dependent on the temperature).

Clusters cause many problems in the operation of the reduction reactor, for example gas channeling, obstructions (especially in zones of small cross-sectional area), instability of the bed, and sometimes the flow of solid particles through the reactor stops altogether with consequent losses in productivity and damage to equipment.

Clustering becomes aggravated in large reactors due to the high "ferrostatic" pressures (i.e., high mechanical pressures exerted on the iron-bearing particles) from the weight of the burden of particles above, due to the time of interparticle contact, and due to the geometric characteristics of the moving or fixed bed reduction reactors.

There has long been a desire and need to find a way of increasing the temperature in DR reactors, and consequently their productivity, and at the same time to inhibit the sticking tendency of iron-bearing particles.

Without intending to link a particular theory or explanation of the phenomena involved in the reduction process with the present invention, applicants believe that during the reduction process, metallic iron is formed at the surface of the iron-bearing particles which are in close contact with other particles surrounding them, and that due to the high temperature, strong interparticle bonds are developed at the points of contact resulting in clusters or agglomerates. Therefore, it is thought that coating the iron-bearing particles with some material that does not have deleterious effects on the reduction reactions and yet inhibits the formation of interparticle bonds, will permit a higher processing temperature in the reactor.

They also believe that by coating the particles with some such material, this will act as a "lubricant" between said particles, modifying the interparticle friction thus permitting a smoother flow of said particles through the reactor.

There have been several proposals addressed to solve the clustering problems. For example, U.S. Pat. Nos. 2,862,808; 4,118,017; 4,374,585 and 4,449,671 show mechanical means mounted at several places in the reactor to destroy clusters that may form. This solution however presents a number of drawbacks because movement of such steel racks or probes in the particles bed break and grind such particles producing dust and fines which in turn can cause gas channeling, and fines losses at the discharge. Furthermore, this type of mechanism needs special seals in the wall of the reactor and also require more capital and maintenance costs.

Another proposal to solve this problem is disclosed in German Laid-open Patent Application No. 2,061,346 comprising forming a coating of a ceramic powder on iron ore pellets. This ceramic powder can be limestone, dolomite, talc (basic magnesium silicate), lime or cement. This patent application however does not include or suggest any specific method or apparatus to apply said coating on the iron ore pellets. The significant problem of finding a way of handling a suspension of cement in large industrial quantities remains.

A later similar proposal is disclosed by K. Narita, D. Kaneko and Y. Kimura, "Study on Clustering and its Prevention in the Shaft Furnace for Direct Reduction Process", Trans. ISIJ, Vol. 20, pp. 228-235, 1980. This paper teaches to coat the surface of high grade pellets with substances such as CaO, MgO and carbon, to prevent clustering in a direct reduction reactor. This paper however also does not teach or suggest any method or apparatus to carry out such coating of pellets.

Applicants' earlier co-workers have disclosed in U.S. Pat. No. 4,388,116 the passivation of sponge iron pellets by coating with a mixture of Portland cement and powdered iron oxide. The patent's coating method entails the pre-wetting of the sponge iron pellets, followed by dusting with the cement/iron oxide dry fines, and thereafter requiring drying of the wet adherent coating in an inert atmosphere. It will be appreciated that the purpose as well as the process of this patent is different from the other references here discussed. The purpose of such other references is to prevent clustering occurring due to an agglomeration of hot iron ore pellets during the reduction process. However, in the passivation patent, it is the already-reduced sponge iron pellets, not iron ore pellets, which are treated. In passivation, the purpose is to prevent oxygen gas from passing into the reduced pellets and reoxidizing such sponge iron. In contrast, one significant aspect of the present invention concerns providing a porous coating on the iron ore pellets to eliminate clustering and yet permit free passage of the reducing gases into the interior of the pellets for completing the necessary reduction to sponge iron.

A further proposal for coating pellets with cement powder to avoid clustering is described in EPO patent No. 0 207 779. This patent publication suggests two methods and apparatus to carry out a coating process with cement. One is by immersing the pellets and the other is by spraying the pellets. Immersion of pellets is carried out by dropping the pellets from a bin into a tank holding a suspension of cement in water and withdrawing the pellets from the tank with a belt conveyor. The wet pellets then pass through a rotating drum-type drier having a screen to separate the fines and the excess of powdered cement. This method of applying the cement coating has the disadvantage of requiring a dryer, because the pellets are soaked with water, and therefore is costly in capital investment and operation. This patent does not teach or suggest how to avoid settling of cement powder in the tank, which is one of the main problems to deal with in practicing this method. The other disclosed method is to spray the cement suspension over the pellets. To this end, a cement suspension is prepared in a tank and then is pumped to a spraying nozzle which sprays the cement suspension over the pellets travelling in a belt conveyor. This spraying system has a number of drawbacks, for example, applicants were unable to find any pump which operates for a practical length of time without such pump becoming plugged and stuck by the cement settling and accumulating at all points in the pump and piping. Several types of pumps were tested and not one was found to function satisfactorily.

It is therefore an object of the invention to provide a non-clogging reliable method and apparatus for coating with cement iron-bearing particles with minimized wetting of the particles, which preferably are iron-ore particles to be processed in a Direct Reduction reactor so as to increase the productivity of direct reduction plants.

SUMMARY OF THE INVENTION

The present invention uses no pumps and forms the cement emulsion at the point where it is to be sprayed. In this way, no clogging of piping occurs. Thus, the preferred embodiments of the invention provide method and apparatus whereby the cement suspension in water is formed at the point of application, thereby avoiding the problems of powder settling and clogging of piping and cement suspension handling equipment.

In general the objects and advantages of the invention are achieved by a method comprising combining said powder and water in predetermined quantities to give a thin slurry in a bin; injecting air into said bin to agitate and cause said cement and water to be thoroughly mixed and maintaining the resulting suspension under agitation by means of said injected air; injecting the same and/or additional air preferably for regulating the amount of cement suspension flowing out of said bin and particularly for spraying said cement suspension over at least a significant portion of said iron-bearing particles; and an apparatus comprising a first bin to store dry cement powder, a second bin to form a cement suspension therein, means for introducing air into said second bin and maintaining said suspension under agitation, a spraying nozzle connected to said bin, and means for introducing a stream of air through said spraying nozzle and for regulating the amount of suspension which passes through said nozzle.

BRIEF DESCRIPTION OF THE DRAWINGS

In this specification and in the accompanying drawings, we have shown and described preferred embodiments of our invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF THE INVENTION

Figure 1:
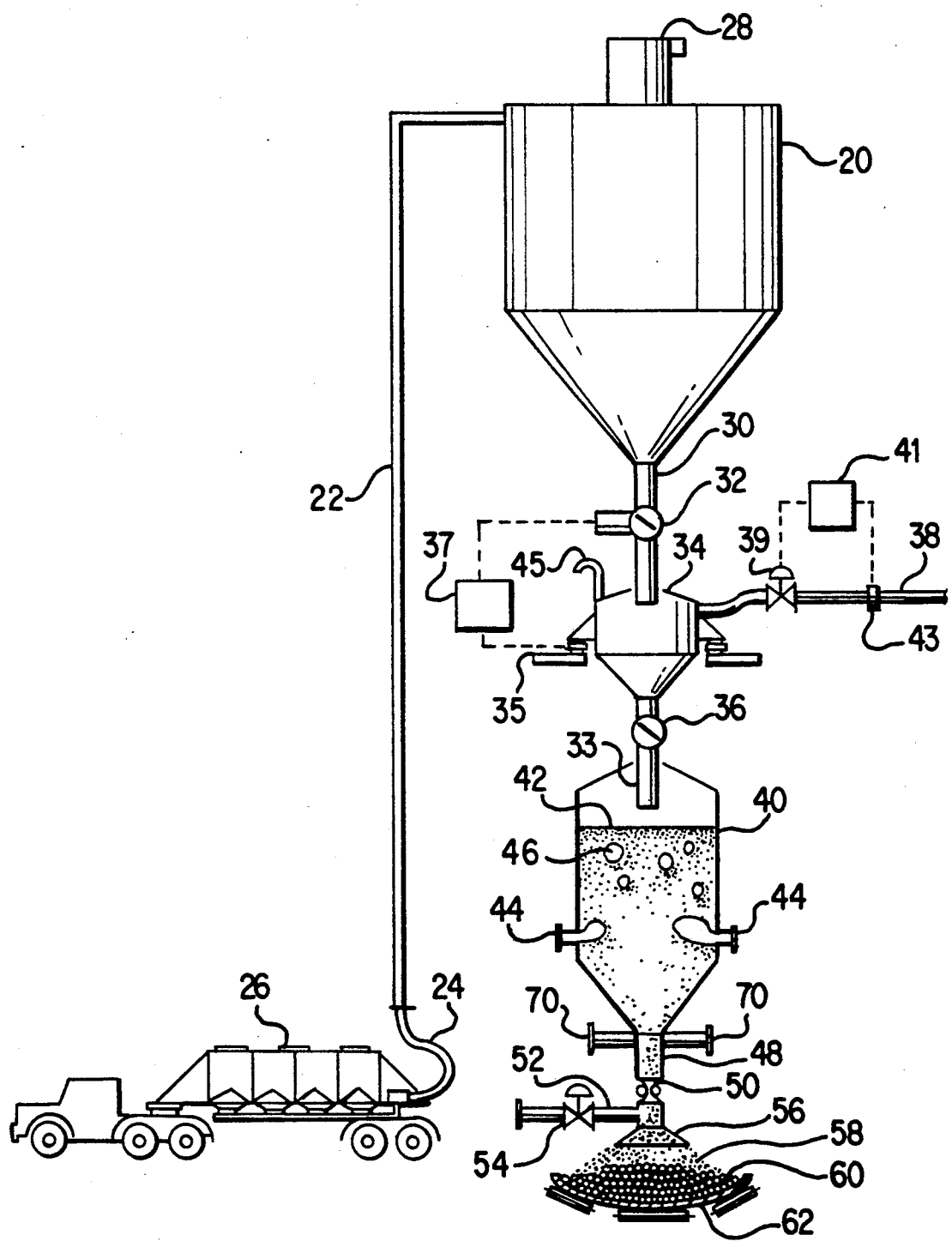
FIG. 1 shows a schematic diagram of an apparatus incorporating a preferred embodiment of the invention.

Referring to FIG 1, dry cement powder is unloaded from a transport vehicle 26 and pneumatically discharged by through a hose 24 connected to pipe 22 which leads the cement into a high capacity bin 20 to store a suitable amount of cement (such as from 20 to 40 tons). Said bin is provided with dust collecting equipment 28 and discharges cement through pipe 30 having a valve 32, which can be of the so-called butterfly valves type. Pipe 30 leads the cement powder to a smaller bin 34 adapted t facilitate the measuring of the right proportions of cement and water in order to obtain a suspension with about 15% by weight of cement. This mixing is preferably done as a batch operation. To this end, bin 34 is provided with load cells 35 for measuring into said bin 34 a predetermined quantity of cement powder, normally about 4 tons, by opening and closing valve 32. Filling bin 34 with said predetermined amount of cement may be made an automatic operation by means of controlling means 37 acting on valve 32 in response to signals from cells 35 etc. in a manner known in the art.

Water is added to the cement in bin 34 by means of pipe 38 having valve 39 to obtain a mixture of 15% of cement by weight. This addition of water can also be made automatically utilizing controlling means 41 and water flow measuring device 43 in a manner known in the art. The suspension of concrete in water will be understood to be a very thin slurry. By contrast, the literature states typical concrete to be in a ratio of 1 concrete, 2 sand and 4 gravel, with 100 lbs. of cement to 6 gallons of water. This would be 100 lbs. of cement to 10.3 lbs. of water or 91% concrete (even before the sand and gravel is added). To facilitate filling the bin 34, the latter is provided with a remote vent pipe 45.

According to broader aspects of this invention the bin 34 could be modified to a continuous flow operation, or even be eliminated altogether (by feeding cement and water directly to the lower bin 40 and increasing the effective agitation therein).

Once the cement and water have been introduced into bin 34 in the predetermined proportions, valve 36 is opened and the mixture flows down into spraying bin 40 via pipe 33. Bin 40 is provided with a plurality of inlets 44 and 70 for air jets to maintain the cement suspension in continuous agitation. It has been found that best results are obtained by injecting air in tangential directions in order to create a rotational movement of the suspension 42. Inlets 44 are suitably placed in the periphery of bin 40 to ensure that all zones of the bin 40 are agitated, because cement would almost immediately settle down if the suspension is left in repose.

The cement suspension passes by gravity through pipe 48 having a normally open valve 50. For simplicity, the valve 50 has been illustrated diagrammatically. Normally, it will present an open flow passage from pipe 48 to nozzle 56. Advantageously, piping 48 (and 33 too) are made from PVC pipe for less wear, less sticking, and easy cleaning; while the valve 50 comprises merely a flexible pipe (e.g. a rubber hose) which can be shut off by a simple clamp. The suspension is sprayed out in a substantially flat fan pattern 58 from nozzle 56 impelled by incoming air introduced through pipe 52. This spray pattern is shaped advantageously to extend mainly across the width of the conveyor belt to cover relatively evenly the upper most layer of pellets 60 which are conveyed past said nozzle 56 by belt conveyor 62. The spray orifice of the nozzle 56 can be of a thin elongated rectangular shape, be slightly elliptical, or even slightly "dumbbell" shape (to even the amount of suspension delivered to the edges of the conveyor relative to center of the belt). The pellets 60 for convenience of illustration have been shown in FIG. 1 and 2 to be in regular array but, in actuality, will be understood to be randomly distributed. See, for example, the conveyor belts and pellet distribution illustrated in U.S. Pat. No. 4,254,876 (incorporated herein by reference, and discussed further below).

The prior art has typically taught that all of the pellets are subjected to the coating process. However, applicants have surprisingly discovered that very effective results can be achieved with merely spraying the top layer of pellets on the conveyor 62, so that the bottom layer, and even the middle layers may receive little or no coating at all. Although not intuitively obvious, it can be appreciated in retrospect that only one of two pellets need to be coated, to hinder effectively one pellet from sticking to the other. Even if only a third or somewhat less of the pellets are coated, this has been found in actual tests to be generally effective. The result will vary depending upon the particular conditions and the types of pelletized ores (or lump ores) being used. It will be further understood that this invention can be used to (1) increase productivity by enabling an increase in the processing temperature at which the reduction reactions can be run without agglomeration (due to softening before melting of the particles), or (2) by running the process at a given set of conditions for all types of ores, some of which (having a greater tendency to stick and form agglomerations) will require pretreatment by the process and others of which under such process conditions would not require such treatment. This flexibility has the advantage that the cost of treatment can be minimized since all of the particles do not require treatment. In some situations, the percentage of particles treated can be lowered sufficiently so as to result in some agglomeration occurring (which would not occur, if a higher percentage were treated), but which is nevertheless acceptable if the clusters are sufficiently small and/or sufficiently fragile as to be tolerable (given the offsetting advantages of minimization of the pretreatment required, of costs, and of reduced volume of cement accumulating downstream in the slag).

In arriving at these conclusions, applicants in actual tests took advantage of the conveyor belt structure of the type illustrated in the apparatus illustrated in U.S. Pat. No. 4,254,876 (which concerns infra-red scanning for hot pellets on a series of conveyor belts). The plurality of belts (see FIGS. 2B and C, 3 and 4 of that patent) have the purpose of redistributing the particles on the conveyor belt so as to give assurance that all particles are at one time or another effectively exposed on the upper surface, for scanning). Two spray stations were established with a capacity and positioning effective to coat all of the particles. However, the decrease in agglomeration was surprisingly found not to be significant over merely spraying only a top layer of particles.

In using the process and apparatus according to the preferred embodiment of the present invention, applicants have been enabled to typically increase the effective reducing gas processing temperature by as much as 20° (typically up to 950–960° C.

In these tests, the applicants have found that the invention can most effectively be practiced with a mixture of cement in water in bin 40 in a proportion ranging from 10-20% by weight of cement to the total weight of the mixture. The amount of cement coating the pellets is regulated to be preferably in the range of 0.01% to 0.15%, and more preferably in an amount of 0.1%, by weight on average. The percentage of cement sprayed over the pellets is calculated using the total weight of pellets charged to the reduction reactor and the total amount of cement spent in a given period of time. This calculation therefore includes the pellets that travel in the lower layers on the belt conveyor which are not sprayed with cement. Consequently, it will be understood that the coating on any given individual pellet receiving the coating may be as much as two to three times greater on average.

Note that this coating can be advantageously applied to either the green pellets or the indurated (fired) pellets.

An advantage of the applicant's process in contrast to the many prior art processes is that no separate drying step is needed, particularly since not all the pellets are treated (especially not being fully immersed in water nor being prewetted and therefore do not need to be impregnated with water to the degree typically required by the prior art processes). Also, the applicants' coating has been found to be sufficiently durable whether applied to green pellets (which are thereafter fired) or alternatively are applied to the indurated (i.e. fire-hardened) pellets. Even though not heat dried, the coated indurated pellets can be handled normally without detriment. Any drying which does not occur naturally will be adequately achieved in the upper region of the reduction zone. The water content of the coated particles is minimized to aid in such natural drying and also to minimize energy consumption needed to drive off such water in the reduction reactor; however, even the latter is not too serious since the off-gas thus affected is then promptly subjected to quench cooling as part of the reducing process and the added water probably helps at that point as a preconditioning of the gas for quench cooling.

Valve 54 regulates the amount of air injected through pipe 52. As explained below, this regulates the amount of cement suspension 58 being sprayed from nozzle 56 by acting both as the spraying agent and as flow regulator of the cement suspension. Valve 50, being normally open, is not utilized to regulate the suspension. This valve 50 is closed only during maintenance or emergencies.

Figure 2:
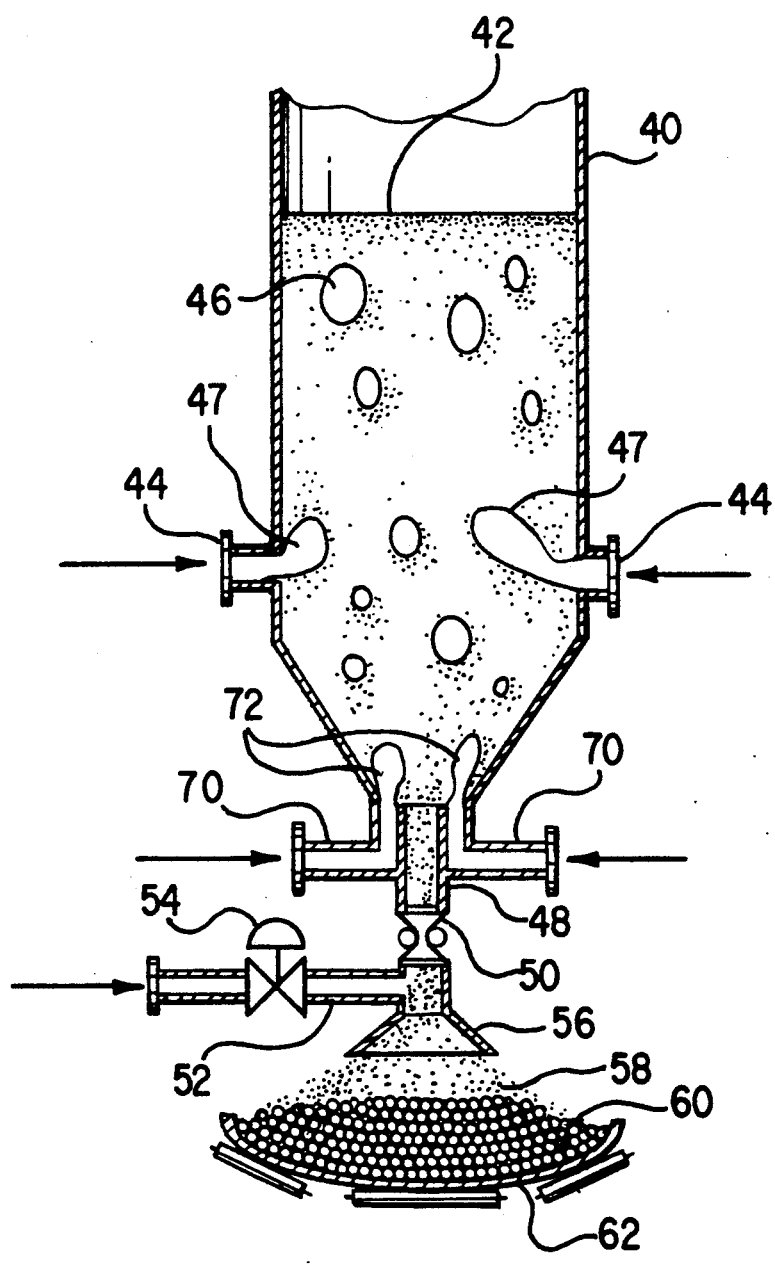
FIG. 2 shows a more detailed schematic diagram on an enlarged scale of the lower spraying bin shown in FIG. 1.

Referring now to FIG. 2 where the same numerals designate the same elements as in Figure 1, bin 40 is provided with upper and lower air inlets 44 and 70 from which air jets 47 and 72 respectively issue forming bubbles 46 that contribute to maintaining the cement suspension under continuous agitation. Also a portion of the air injected through pipe 52 flows upwardly adding to the agitation. The nozzle 56 is sufficiently restricted in size relative to the volume of slurry being sprayed therefrom, so that an increase in the volume of air from pipe 52 mainly serves to result in an increasing upflow of air through pipe 48 thus regulating the amount of suspension which can flow down through the pipe 48 (as well as contributing further to the agitation in bin 40). The valve 50 is normally open and is of the restrictable flexible hose type. The cement suspension flows downwardly through pipe 48 and is sprayed as indicated by spray pattern 58, in an area delimited by nozzle shape over the pellets which travel past the spraying nozzle by means of conveyor 62.

What is claimed is:

1. Method of coating iron-bearing particles with a water-insoluble powdery material, said method comprising:
   introducing said powdery material and water in predetermined quantities into a container to form a suspension;
   mixing and maintaining under agitation said suspension by injecting air into said container; and
   spraying said suspension from a discharge point of said container, said discharge point being proximate said iron-bearing particles, said spraying forming a coating on at least part of some of particles, and while spraying, injecting a stream of air into said suspension proximate, but upstream of said discharge point so as to regulate the amount of said suspension flowing out of the discharge point and onto the particles.

2. Method according to claim 1, wherein said powdery material is Portland cement.

3. Method according to claim 2, wherein said suspension comprises 10 to 20% by weight of cement.

4. Method according to claim 2, wherein sd iron-bearing particles are pellets of iron ore and said spraying comprises at least partially coating said pellets with said cement in an amount of 0.05 to 0.1% by weight of the coated pellets.

5. Method according to claim 4, wherein said pellets are sprayed such that only about ⅓ to ⅔ of the pellets are coated with cement.

6. Method of producing sponge iron comprising direct reduction of pellets coated by the method according to claim 5.

7. Method of coating iron-bearing particles with a powdery material non-soluble in water comprising:
   introducing said powdery material and water in predetermined quantities into a bin;
   injecting air into said bin to cause said powdery material and water to be thoroughly mixed to form a suspension and maintaining said suspension under agitation by means of said injected air; and
   injecting a stream of air into a narrow discharge pipe of said bin for regulating the amount of said suspension flowing out of said bin through said pipe and for spraying said suspension over said iron-bearing particles.

* * * * *